May 12, 1931.  D. DESMOND  1,804,749

MEASURING DEVICE

Filed Feb. 24, 1928  2 Sheets-Sheet 1

Inventor
Daniel Desmond.
By Harry H. Styll.
Attorney

May 12, 1931.  D. DESMOND  1,804,749
MEASURING DEVICE
Filed Feb. 24, 1928   2 Sheets-Sheet 2
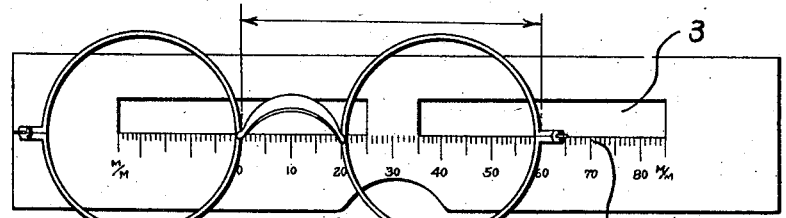
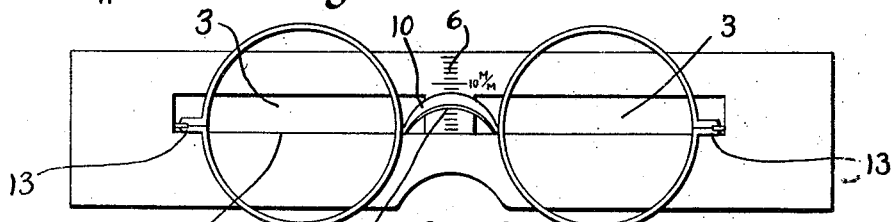
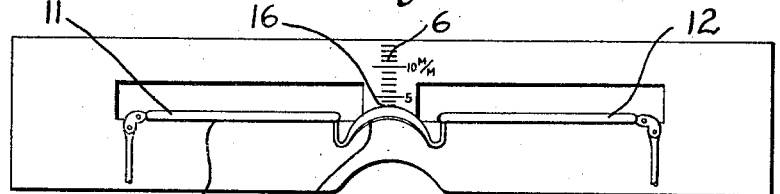
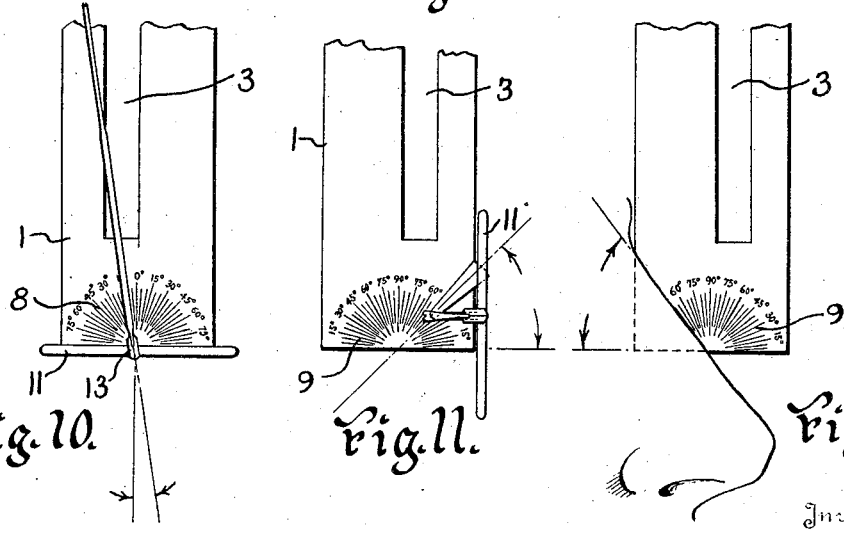
Daniel Desmond.
By Harry H. Styll.
Attorney Patented May 12, 1931

1,804,749

UNITED STATES PATENT OFFICE

DANIEL DESMOND, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

MEASURING DEVICE

Application filed February 24, 1928. Serial No. 256,515.

This invention relates to measuring devices and has particular reference to a measure for fitting ophthalmic mountings.

The principal object of the invention is to provide a combined face and ophthalmic frame measure.

Another object of the invention is to provide a combined face and ophthalmic frame measure having means for measuring the total pupillary distance of the eye.

Another object of the invention is to provide a combined face and ophthalmic frame measure having scale means for determining the position of each eye relative to the nose of the patient.

Another object of the invention is to provide a combined face and ophthalmic measure having scale means for measuring the projection or inclination of the bridge portion of an ophthalmic mounting.

Another object of the invention is to provide a combined face and ophthalmic frame measure having scale means for measuring the base of the bridge of an ophthalmic mounting.

Another object of the invention is to provide a combined face and ophthalmic frame measure having scale means for measuring the height of the bridge of an ophthalmic mounting.

A further object of the invention is to provide a combined face and ophthalmic frame measure having means for measuring the angle of the temple.

A further object of the invention is to provide a combined face and ophthalmic frame measure having means for measuring the angle of the bridge of an ophthalmic mounting.

A further object of the invention is to provide a combined face and ophthalmic frame measure having means for determining the approximate angle of the nose of the patient.

A further object of the invention is to provide a combined face and ophthalmic frame measure having scale means for determining the pupillary distance measure of an ophthalmic mounting.

A further object of the invention is to provide simple, efficient and economical scale means which may be used for various face and ophthalmic frame measurements.

Other objects and advantages of the invention will be apparent from the following specification taken in connection with the accompanying drawings and it will be apparent that many changes may be made in the details of construction and arrangement of parts without departing from the spirit of the invention as expressed in the accompanying claim. I, therefore, do not wish to be limited to the exact details and arrangements shown as the preferred forms only have been shown by way of illustration.

Referring to the drawings:

Fig. 7 is an elevation illustrating another use of the invention.

Fig. 8 is an elevation illustrating another use of the invention.

Fig. 9 is an elevation illustrating a further use of the invention and

Figs. 10, 11 and 12 are partial face views illustrating further uses of the invention.

In the past there have been many measuring devices designed for face and ophthalmic frame measures but in most cases each device was adapted for one particular measurement. These devices were, therefore, incomplete as it was necessary to have many different measures or instruments for making the various measurements required in fitting ophthalmic mountings.

This invention is designed to provide a combined measure having various scale means for making the various measurements and provides a handy, simple, compact and useful measure which may be carried in the pocket of the practitioner or optometrist.

Figure 1:
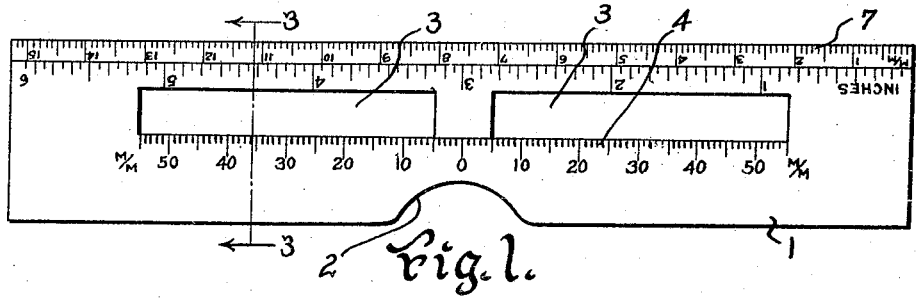
Fig. 1 is a front elevation of the scale embodying the invention.
Figure 2:
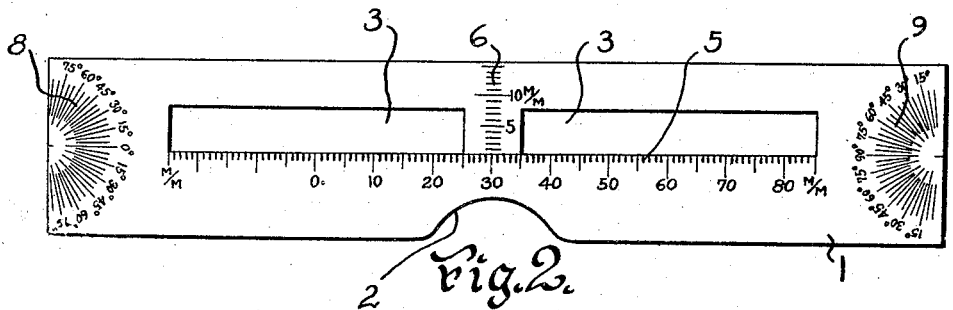
Fig. 2 is a rear elevation of the scale embodying the invention.
Figures 3, 4:
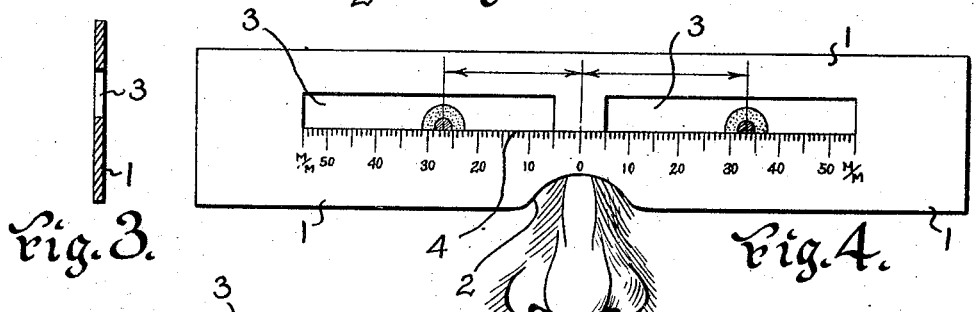
Fig. 3 is a section on line 3—3 of Figure 1.
Fig. 4 is an elevation illustrating one of the uses of the scale embodying the invention.
Figure 5:
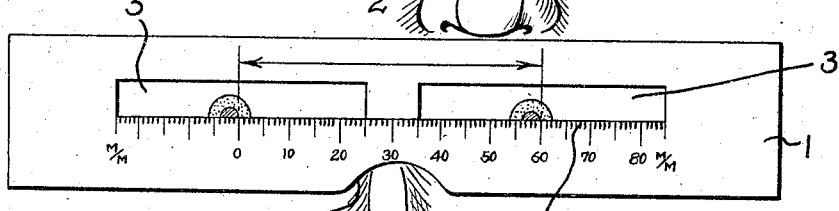
Fig. 5 is an elevation illustrating a further use of the invention.

Referring more particularly to the drawings the base member 1 is cut away at 2 to provide a clearance for the nose of the patient and is also provided with suitable openings 3 for observing the eyes of the patient. The openings 3 are provided with graduated edges 4 which are used as illustrated in Fig. 4 for determining the position of each eye relative to the center of the nose. The openings 3 are also provided on the rear face of the rule with the graduated edges 5 used as illustrated in Fig. 5 for determining the total pupillary distance measurement. The scale 5 may also be used as illustrated in Fig. 7 for determining the pupillary distance measurement of an ophthalmic frame. The base member 1 is provided centrally with the graduated portion 6 which may be used as illustrated in Fig. 8 for measuring the height of the bridge or as illustrated in Fig. 9 for determining the projection or inclination of the bridge of an ophthalmic mounting.

Figure 6:
Fig. 6 is a partial elevation illustrating a further use of the invention.

The base member 1 is also provided with the graduated edge 7 which may be used as illustrated in Fig. 6 for measuring the base of the bridge. This edge may be graduated in millimeters and inches and may be used for any scale measure desired. One end of the base member 1 is provided with a protractor 8 used as illustrated in Fig. 10 for measuring or determining the angle of the temple of an ophthalmic mounting and the opposite end of the base member is likewise provided with the protractor 9 which may be used as illustrated in Fig. 11 for determining the approximate angle of the patient's nose.

The measurement illustrated in Fig. 4 is made by centering the zero graduation of the scale 4 with the center line of the nose of the patient and reading the graduations on each side of the zero mark to the center of the pupil of the eye. One eye may be a greater distance away from the nose than the other and the amount is determined by this measurement.

The measurement made by the opposite face of the base member 1 as illustrated in Fig. 5 is made by positioning the zero graduation of the scale 5 at the inner edge of the pupil of the right eye and taking the reading from this point to the outer edge of the pupil of the left eye. This gives the total pupillary distance measurement of the eyes.

The measurement illustrated in Fig. 6 is made by placing the graduated edge 7 on the base of the bridge 10 and measuring the span of the bridge. This gives the so-called base measurement.

The measurement illustrated in Fig. 7 is made by placing the inner edge of the rim 11 of an ophthalmic frame on the zero graduation of the scale 5 and reading to the outer edge of the rim 12. This distance is equivalent to the pupillary distance as taken from the centers of the lens rims 11 and 12 and provides means for making a so-called pupillary measurement of the ophthalmic mounting.

The measurement illustrated in Fig. 8 is made by aligning the endpiece members 13 of an ophthalmic frame and the base of the bridge member 10 with the edge 14 of the openings 3. The reading is then taken on the graduated scale 6 from the line 14 to the point 15. This gives the height of bridge.

The measurement illustrated in Fig. 9 is made by resting the rims 11 and 12 of an ophthalmic mounting on the edge 14 of the openings 3 and reading the scale 6 from the line 14 to the point 16. This provides means for measuring the projection or inclination of the bridge 10.

The measurement illustrated in Fig. 10 is made by resting the end of the base member 1 on the rim 11 of the frame and aligning the zero graduation of the protractor with the center of the endpiece 13, the reading is then taken along the line of the protractor corresponding to the angle of the temple. This provides means for determining the angle of the temple.

The measurement illustrated in Fig. 11 is made by aligning the center line of the bridge 10 of the frame with the corresponding angular line of the protractor 9, it being understood that this measurement is for determining the approximate angle of the bridge and that the lens rims 11 and 12 are held in alignment with the longitudinal edge of the scale 7 at the time the measurement is made.

The measurement illustrated in Fig. 12 is made by holding the scale in a vertical position and aligning the bridge of the nose with the corresponding angular line of the protractor 9. This provides means for measuring the approximate angle of the nose of the patient.

From the foregoing description it will be seen that I have provided simple, efficient and economical means for making various measurements of the character stated.

Having described my invention, I claim:

In a device of the character described, an elongated relatively thin base member having its material disposed in a single plane and said member forming a single unitary integral structure and having a pair of separated slots, each slot extending longitudinally of the base and intermediate the center and an end thereof and said base member having scale means adjacent one edge of the slots, said slots being so arranged that the pupils of the eyes may be seen therethrough, one in each slot, and the scale being so arranged that the distance between the said pupils may be read thereon, and said base member also having a recess in one edge central of the slots and adapted to fit over the nose.

DANIEL DESMOND.